United States Patent
Arai et al.

(10) Patent No.: US 6,820,004 B2
(45) Date of Patent: Nov. 16, 2004

(54) OPERATION SUPPORTING APPARATUS

(75) Inventors: Daisuke Arai, Tokyo (JP); Fujio Hayakawa, Tokyo (JP); Toyoaki Kitano, Tokyo (JP); Yutaka Kotani, Tokyo (JP); Yutaka Yamagishi, Tokyo (JP); Masahiro Ieda, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/312,854
(22) PCT Filed: May 28, 2001
(86) PCT No.: PCT/JP01/04464
§ 371 (c)(1),
(2), (4) Date: Jan. 2, 2003
(87) PCT Pub. No.: WO02/097372
PCT Pub. Date: Dec. 5, 2002

(65) Prior Publication Data
US 2003/0105586 A1 Jun. 5, 2003

(51) Int. Cl.[7] .............................................. G01C 21/00
(52) U.S. Cl. ........................ 701/211; 701/201; 701/23
(58) Field of Search .............................. 701/211, 200, 701/209, 25

(56) References Cited

U.S. PATENT DOCUMENTS 5,864,771 A * 1/1999 Yokoyama et al. ......... 701/208
6,202,008 B1 * 3/2001 Beckert et al. ............... 701/33

FOREIGN PATENT DOCUMENTS

| JP | 7-83674 A | 3/1995 |
| JP | 7-159190 A | 6/1995 |
| JP | 8-110237 A | 4/1996 |
| JP | 8-252279 A | 10/1996 |
| JP | 10-339647 A | 12/1998 |
| JP | 2000-74687 A | 3/2000 |

* cited by examiner

Primary Examiner—Yonel Beaulieu
(74) Attorney, Agent, or Firm—Birch, Stewart, Kolasch & Birch, LLP

(57) ABSTRACT

In response to a voice request from a facility judgment means which judges the location of such a facility from the current position selected in advance based on the current position and map data, the voice guidance generated by guidance synchronizing means is converted by stereophonic or three dimensional signal processing means into a stereophonic or three dimensional sound field signal, and outputted to at least two or more speakers which generate a stereophonic or three dimensional sound field reproducing space corresponding to the left and right external ears of a listener. The distance to, and the direction of, the facility that has been selected in advance are informed by the movement of an image of a stereophonic or three dimensional sound with rich presence.

16 Claims, 4 Drawing Sheets

OPERATION SUPPORTING APPARATUS

This application is the national phase under 35 U.S.C. §372. of PCT International Application No. PCT/JP01/04464 which has an International filing date of May 28, 2001, which designated the United States of America.

TECHNICAL FIELD

This invention relates to a driving support apparatus in which, when a facility selected by a driver has appeared within a range of a predetermined distance in front of, and in the left or right direction of, his/her own vehicle position, the direction of, and the distance to, the facility are informed by the movement of an image of a stereophonic or three dimensional sound.

BACKGROUND ART

In the case of a vehicle-mounted navigation apparatus, it is possible to display facilities standing around one's own vehicle on a map irrespective of whether navigation is being done or not. In addition, the facilities are displayable for each genre covering from a public facility to a gas station, each being often represented by a symbolic icon.

Depending on the place and genre, a many facilities are, however, aggregated densely and icons are displayed overlapped, with the result that the driver can hardly recognize them. The same things will be occurred depending on the scale of the selected map. It falls under the case where the facilities such as eating houses, or the like, are selected. In such a case, the driver unconsciously must stare at the display screen for recognition, which hinders the safety driving.

This invention has been made in order to solve the above problems and has an object of providing a driving support apparatus which informs the driver of a direction of, and the distance to, the facility by means of a stereophonic or three dimensional sound.

DISCLOSURE OF INVENTION

The driving support apparatus according to this invention includes facility judging means for judging a location, from a current position, of a facility selected in advance, based on the current position and map data; guidance synchronizing means for giving voice guidance by generating voice data when a result of judgement by the facility judging means contains a voice request; voice guidance means for calling stereophonic or three dimensional sound field generation based on the voice guidance generated by the guidance synchronizing means; stereophonic or three dimensional signal processing means for outputting a volume signal based on a call of voice guidance from the voice guidance means after converting the volume signal to a stereophonic or three dimensional sound field signal; and at least respectively two speakers for generating stereophonic or three dimensional sound field reproduction space corresponding to left and right outer ears of a listener upon receipt of the stereophonic or three dimensional sound field signal.

According to this arrangement, it is possible to inform the listener of the distance from the current position to, and the direction of, the facility that has been selected in advance by the movement of the image of the stereophonic or three dimensional sound. The listener is thus able to keep on driving while looking ahead without turning his/her eyes onto the map on the display. This facilitates the confirmation of the facility and contributes to the safety driving.

The facility judging means of the driving support apparatus according to this invention includes current position estimating means for estimating the current position; facility information extracting means for reading facility information selected in advance from data base having stored therein facility information; and leading means for searching a route from the current position to the facility by inputting the current position, the map data and the selected facility information.

According to this arrangement, if the facility standing on one of the left lane and the right lane depending on the running lane, e.g., on the left lane in Japan, is exclusively selected, it is not necessary to make a U-turn or a right-turn if the guidance is made on the facility that is being looked for, which ensures the safety driving. This is particularly effective on a road having a median strip or a plurality of lanes.

The driving support apparatus according to this invention further includes painting means for painting on display means based on a paint request from the guidance synchronizing means.

According to this arrangement, it becomes possible to display the facility that has been selected in advance on the route searching of the map. Together with the voice indication, this facilitates the confirmation of the location of the facility.

In the driving support apparatus according to this invention the voice guidance means includes a volume profile for outputting a volume corresponding to the voice data.

According to this arrangement, the stereophonic or three dimensional signal processing means can input a volume corresponding to the voice data, thereby facilitating the signal conversion processing.

BEST MODE FOR CARRYING OUT THE INVENTION

In order to explain this invention in more detail, a description will now be made about the best mode for carrying out this invention with reference to the accompanying drawings.

First Embodiment

Figure 1:
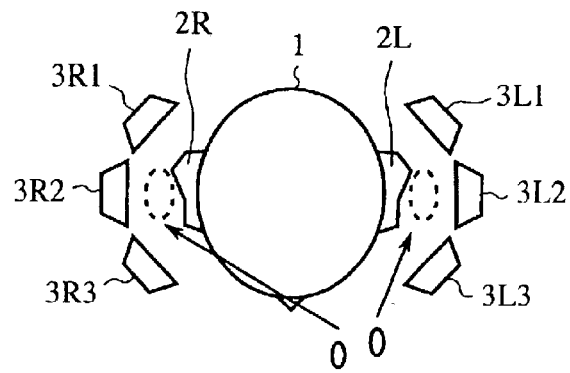
FIG. 1 is a schematic view showing the state of arrangement of speakers to reproduce the stereophonic or three dimensional sound.

FIG. 1 is a schematic drawing showing an arrangement of speakers in a driving support apparatus in the first embodiment. Here, let us suppose three speakers 3L1, 3L2, 3L3 and 3R1, 3R2, 3R3 to be respectively disposed near each of the ears 2L, 2R of a listener 1 and the sound fields near the external ears to be stereophonic or three dimensional sound fields by means of signals supplied to each of the speakers.

In FIG. 1, three speakers 3L1, 3L2, 3L3 and 3R1, 3R2, 3R3 are respectively disposed for each of the left external ear and the right external ear. The reason why this kind of arrangement is preferable is given below. In this case the control points (points in the space at which a target state of sound waves is reproduced) are three points near the respective external ears.

First Reason

It is possible to produce at the control points the same sound pressure as in the case of the original sound field. In order to realize it, a transfer function (an impulse response as represented by a time domain) is required from the speakers 3L1, 3L2, 3L3 and 3R1, 3R2, 3R3 to the control points.

The shorter the time of this transfer function becomes, the smaller the scale of the hardware for the signal processing becomes. Therefore, the arrangement of the speakers should be selected so as to shorten the time as much as possible. In an ordinary room or a vehicle compartment, it has a tendency that the shorter the distance between the speakers and the control points becomes, the shorter the time of the transfer function becomes.

It is because that the more the speakers and the control points away from each other, the larger the ratio of the reflected sounds, arrived at the control points from all directions of the room or the vehicle compartment becomes as compared with the direct sounds arrived at the control points directly from the speakers. Conversely, in case the distance between the speakers and the control points is small the ratio of the direct sounds arrived at the control points directly from the speakers becomes large as compared with the reflected sounds inside the room. The amplitudes of the transfer function will thus be occupied for the most part by the direct sounds, and the amplitude component of the reflected sounds becomes extremely small as compared with the direct sounds. For this reason, the time of the transfer function can be regarded as the time during which the direct sounds converge.

Second Reason

Since the head of the listener is in a space between the speakers which are respectively disposed in the left and right, the speakers can be disposed close to his/her external ears, thereby reducing the ratio of crosstalk occurred between the ears. The closer the right speakers are brought to the right ear, the larger the ratio between the sounds becomes that directly come into the right ear and the sounds that leak to the opposite left ear, thereby decreasing crosstalk.

If the amount of crosstalk occurred between the left and right is small, it will become possible to independently perform the signal processing of the left and right sound fields at the time of controlling the sound fields O near the external ears. The greatest advantage thereof is in that the amount of computation is alleviated down to ½. The signal processing performed in the stereophonic or three dimensional sound field reproducing apparatus is proportional to the product of the number of the speakers and that of the control points.

Now, suppose that the number of the speakers is respectively N in the left and the right and that the number of the control points is also respectively N in the left and the right. In case the amount of crosstalk is small and the left and right signal processing can be independently performed, the amount of computation is N×N for each ear and 2×(N×N) for both the left and right ears. On the other hand, in case the amount of crosstalk is large, it is necessary to process the left and right signals together, and the amount of computation is 2N×2N, i.e., 4×(N×N). In case there is no crosstalk, the amount of computation goes down to ½.

The driving support apparatus of this invention does not necessarily coerce the number of the speakers in the left and right to be limited to three, respectively. Theoretically, since the control points increase in correspondence with the number of the speakers, the larger the number of the speakers becomes, the more the original sound field is accurately simulated. However, since the amount of signal processing is proportional to the second power of the number of the speakers, the apparatus having an unreasonably large number of speakers is not practical considering the number of the channels and the capacity of computation processing in an ordinary audio device.

When considered from the viewpoint of simulation accuracy, on the other hand, disposing one speaker on the left and right side respectively shows little or no difference from the conventional headphone system. Therefore, the reasonable choice will be at least two speakers or more for each ear. This method using two speakers for each ear is, however, insufficient in accuracy because the sound field can only be reproduced along the line connecting the two control points.

In case three speakers are used for each ear, the sound field can be reproduced within the region of a triangle formed by connecting the three control points. In this case, it is possible to reproduce even the travelling direction of the sound wave inside the region as a result of reproduction of the sound pressure at the control points. In order to perceive the stereophonic (three dimensional) sound field, it is highly important that the travelling direction of the sound wave is reproduced. Considering even the direction of propagation of the sound wave expects to highly accurate reproduction of the sound field and the number of the speakers which does not amount to a large scale for practical use will be respectively three in the left and right, i.e., six in total. This number might be said to be the basic level in effectuating this invention.

Figure 2:
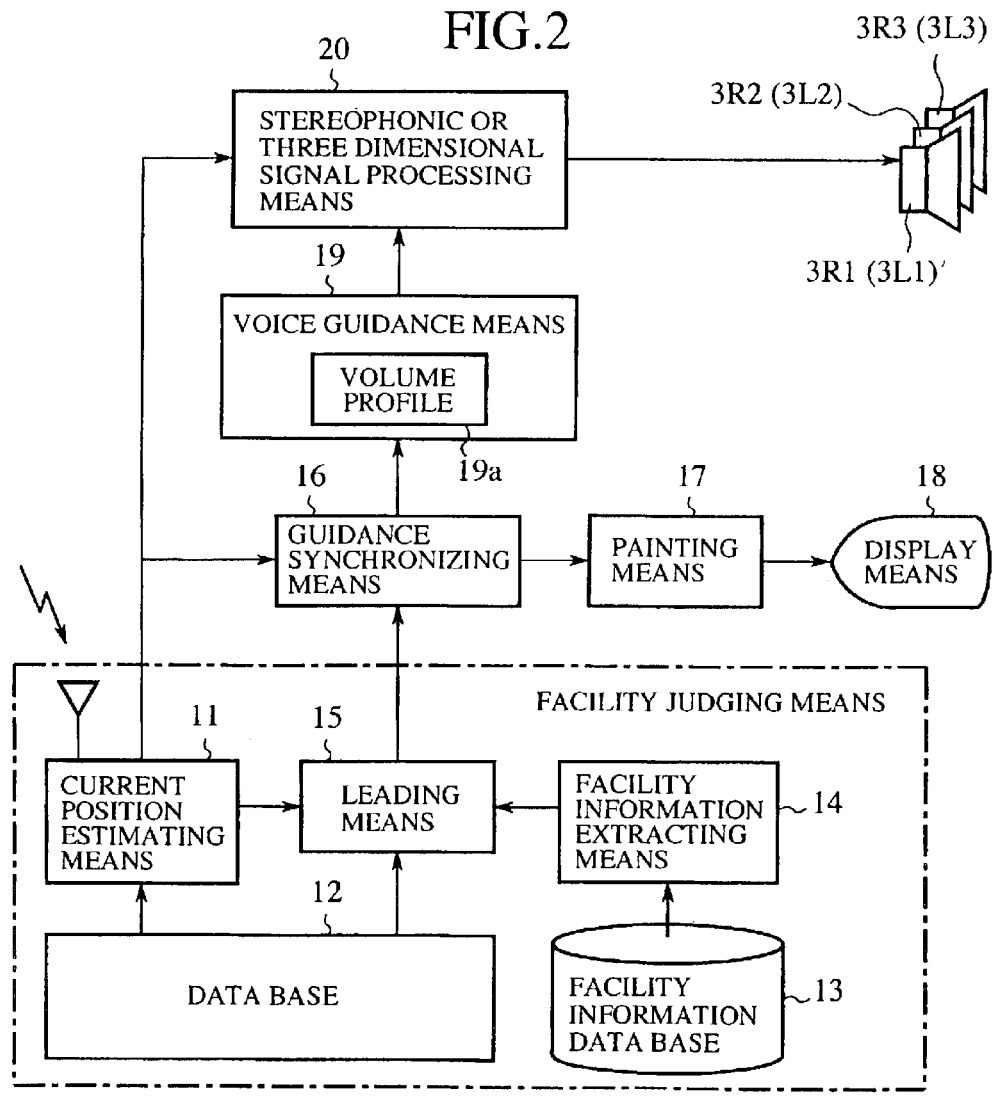
FIG. 2 is a block diagram showing a configuration of a driving support apparatus according to a first embodiment.

FIG. 2 is a block diagram showing a configuration of the driving support apparatus which is provided with the speakers devised based on the above-described principle.

Reference numeral 11 denotes current position estimating means which estimates the current position by receiving a signal from a global positioning system (GPS). Reference numeral 12 denotes a data base which stores therein map data, data on the shapes of intersections, or the like. Reference numeral 13 denotes a data base which stores therein the facility information. Reference numeral 14 denotes facility information extracting means which extracts the facility information from the data base 13. Reference numeral 15 denotes leading means which searches for a route from the current position to the facility by inputting the current position outputted from the current position estimating means 11, the map data read out from the data base 12, and the facility information supplied from the facility information extracting means 14. Reference numeral 16 denotes guidance synchronizing means which calls paint and voice guidance by making a judgment of a paint request and a voice request based on the output of the current position estimating means 11 and the leading means 15. Reference numeral 17 denotes painting means which paints on the display means 18 based on the call for paint from the guidance synchronizing means 16. Reference numeral 19 denotes voice guidance means which outputs a volume signal based on the call for voice guidance from the guidance synchronizing means 16. Reference numeral 20 denotes stereophonic or three dimensional signal processing means which supplies a stereophonic or three dimensional sound field generating signal to the above-described speakers 3L1, 3L2, 3L3 and 3R1, 3R2, 3R3 based on the output from the current position estimating means 11 and the voice guidance means 19. The above-described current position estimating means 11, the data base 12, the facility information data base 13, the facility information extracting means 14 and the leading means 15 constitute a facility judging means.

The operation of the driving support apparatus of the first embodiment will now be described.

Figure 3:
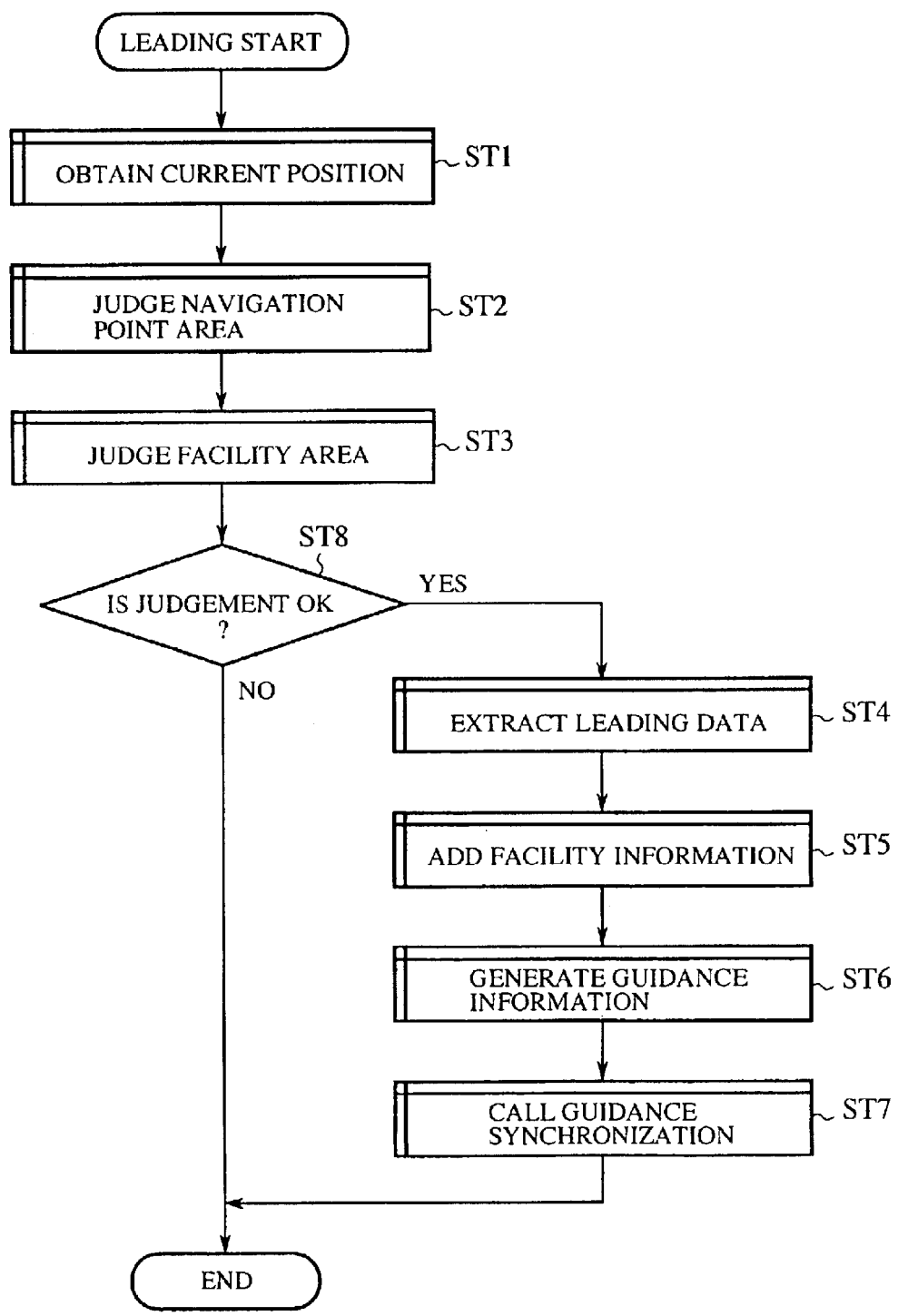
FIG. 3 is a flow chart explaining the operation of leading means.

FIG. 3 is a flow chart explaining the operation of the leading means 15. First, when the operation of the leading means 15 is started, the current position is obtained from the current position estimating means 11 (step ST1). A judgement is made on the navigation point area based on the map data which are read out from the data base 12 (step ST2), and on the facility area based on the output signal from the facility information extracting means 14 (step ST3).

Then, a decision is made as to whether the judgement is OK or not (step ST8). If yes, the leading data extraction for the route searching (step ST4), the facility information addition to the searched route (step ST5), the guidance information generation (step ST6), and the guidance synchronization call (step ST7) are successively performed. Otherwise, the operation is finished.

Figure 4:
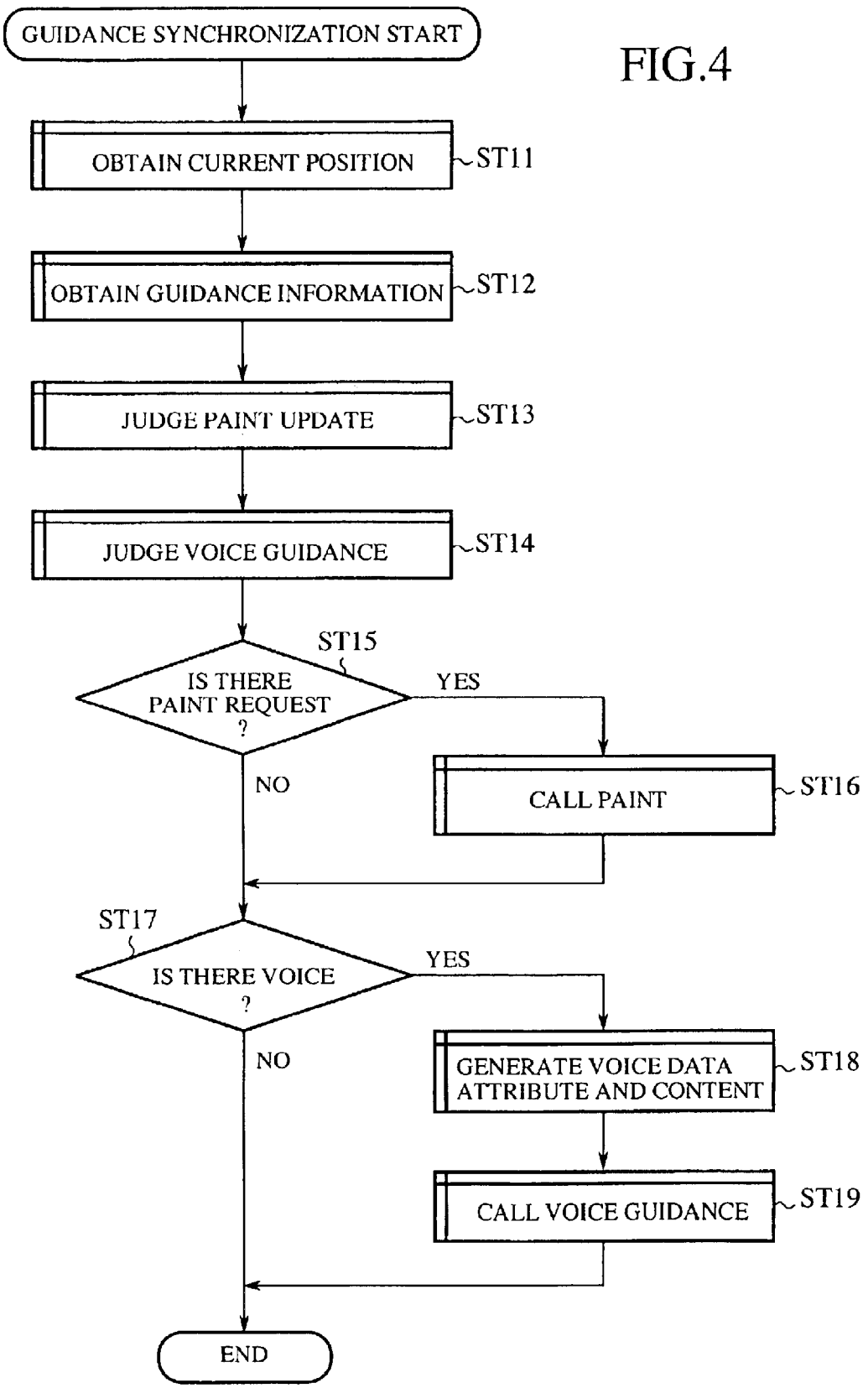
FIG. 4 is a flow chart explaining the operation of guidance synchronizing means.

FIG. 4 is a flow chart explaining the operation of the guidance synchronizing means 16. When the operation of the guidance synchronizing means 16 is started, the current position is obtained from the current position estimating means 11 (step ST11), and acquisition of the guidance information outputted from the leading means 15 (step T12), the judgement of the paint update (step ST13), and the judgement of voice guidance (step ST14) are successively performed.

Thereafter, a decision is made as to whether there is a request for paint or not (step ST15). If yes, after making a call for paint (step ST16), paint is done on the display means 18. Otherwise, the process proceeds to a decision as to whether there is a voice request. If YES (step ST17), the voice data attribute and content are generated (step ST18) and thereafter, a call for voice guidance is made (step ST19). Otherwise, the operation is finished.

Figure 5:
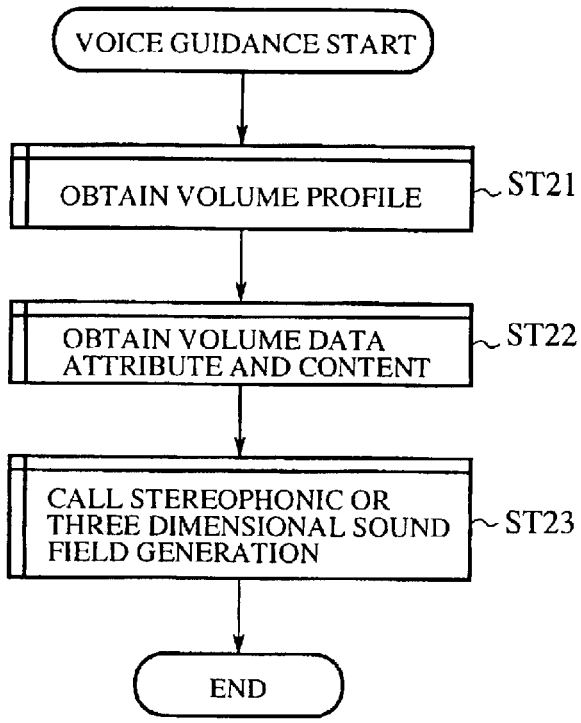
FIG. 5 is a flow chart explaining the operation of voice guidance means.

FIG. 5 is a flow chart explaining the operation of the voice guidance means 19. When the operation of the voice guidance means 19 is started, volume profile is obtained from a memory 19a provided in the voice guidance means 19 (step ST21). Then, the voice data attribute and content are obtained from the guidance synchronizing means 16 (step ST22), and the call is successively made for the stereophonic or three dimensional sound field generation at a volume corresponding to the voice data attribute and content (step ST23), and then the operation is finished.

Figure 6:
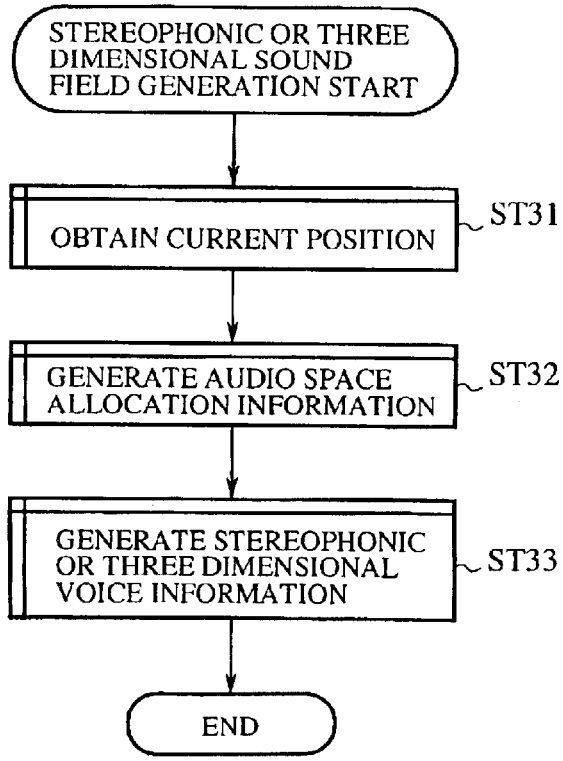
FIG. 6 is a flow chart explaining the operation of a stereophonic or three dimensional signal processing means.

FIG. 6 is a flow chart explaining the operation of the stereophonic or three dimensional signal processing means 20. When the operation of the stereophonic or three dimensional signal processing means 20 is started, the current position is obtained from the current position estimating means 8 (step ST31). Based on the call of the stereophonic or three dimensional sound field from the voice guidance means 19, the generation of audio space allocating information (step ST32), and subsequently the generation of stereophonic or three dimensional voice information (step ST33) are performed. This stereophonic or three dimensional voice information is supplied to the speakers 3L1, 3L2, 3L3 and 3R1, 3R2, 3R3 and an approach is made to the facility that has been selected in advance along the searched route.

When it is recognized from the map data that the facility is within a predetermined distance, e.g., within 100 meters, the distance to, and the direction of, the facility are informed by the movement of the image of the stereophonic or three dimensional sound.

As described above, according to the first embodiment, when one's own vehicle approaches within a predetermined distance of the facility that has been selected in advance, the distance to, and the direction of, the facility are informed by the movement of the image of the stereophonic or three dimensional sound. The driver can therefore keep on driving while looking forward without turning his/her eyes onto the display screen of the display means. This facilitates the confirmation of the facility and also contributes to the safety driving.

In other words, while one is driving a vehicle, there often occurs the necessity that he/she must have a meal or feed the vehicle with oil. In such a case, the driver may wish to select the kind of food or to designate such a gas station run by a gasoline manufacturer as he/she ordinary uses. Then, such a facility is ordinarily represented by a simple icon on the map which is displayed on the display screen of the navigation apparatus. However, in order to look at the display screen, less attention is likely to be paid to the confirmation of the front of the vehicle.

According to this first embodiment, it is possible to inform the location and the direction of the facility by the movement of position of the image in the stereophonic or three dimensional sound. Therefore, the driver is freed from the action of turning his/her eyes from the front of the vehicle to the display screen of the navigation apparatus inside the vehicle, which contributes to the safety driving.

In addition, if the facility standing along one of the left and right lanes depending on the running lane, e.g., only along the left lane in Japan, is exclusively selected, there is no need of making a U-turn or a right-turn when the facility that is being looked for has found, which contributes to the safety driving. This is particularly effective in the road having a median strip or a plurality of running lanes.

Industrial Applicability

As described above, the driving support apparatus is suitable for informing the driver, by the movement of the stereophonic or three dimensional image with rich presence, of the distance to, and the direction of, a facility which has been selected in advance when the vehicle comes within a predetermined distance of the facility.

What is claimed is:

1. A driving support apparatus comprising:

facility judging means for judging a location, from a current position, of a facility selected in advance based on the current position and map data;

guidance synchronization means for giving voice guidance by generating voice data when a result of judgment by said facility judging means contains a voice request;

voice guidance means for calling stereophonic or three dimensional sound field generation based on the voice guidance generated by said guidance synchronizing means;

stereophonic or three dimensional signal processing means for outputting a volume signal based on a call of voice guidance from said voice guidance means after converting the volume signal to a stereophonic or three dimension sound field signal; and at least respectively two speakers for generating stereophonic or three dimensional sound field reproduction space corresponding to left and right outer ears of a listener upon receipt of said stereophonic or three dimensional sound field signal, said speakers outputting a moving sound corresponding to the directional movement of said listener that indicates to said listener the direction and location of the facility located within a predetermined distance of the listener.

2. The driving support apparatus according to claim 1, wherein said facility judging means comprises:
current position estimating means for estimating the current position;
facility information extracting means for reading facility information selected in advance from data base having stored therein facility information; and
leading means for searching a route from the current position to the facility by inputting the current position, the map data and the selected facility information.

3. The driving support apparatus according to claim 1, further comprising painting means for painting on display means based on a paint request from said guidance synchronizing means.

4. The driving support apparatus according to claim 1, wherein said voice guidance means comprises a volume profile for outputting a volume corresponding to the voice data.

5. A vehicular navigation system, comprising:
means for determining the current location of a vehicle with respect to the location of a selected facility, and for determining when the vehicle is within a predetermined distance of the facility; and
means for providing sounds to a listener, responsive to said determining means, said sound providing means including a stereophonic or three dimensional audio system having a plurality of speakers surrounding the listener;
wherein said speakers output moving sound to the listener indicating that the vehicle is within the predetermined distance of the facility, and said moving sound corresponding to the directional movement of the vehicle with respect to the facility, such that the moving sound provides the listener with an audio indication of the location of the vehicle with respect to the selected facility.

6. A vehicular navigation system, according to claim 5 wherein the moving sound indicates to the listener that the selected facility is located either to left or right of the vehicle.

7. A vehicular navigation system, according to claim 6 wherein the moving sound indicates to the listener that the selected facility is located either to the front or rear of the vehicle.

8. A vehicular navigation system, according to claim 7 which further includes means for providing a visual indication of the location of the selected facility.

9. A method of operating a vehicular navigation system, comprising the steps of:
determining the current location of a vehicle with respect to the location of a selected facility, and determining when the vehicle is within a predetermined distance of the facility; and
providing sounds to a listener, responsive to said determining means, said sounds being either stereophonic or three dimensional sounds emitted from a plurality of speakers surrounding the listener;
wherein said sound moves with respect to the listener indicating when the vehicle is within the predetermined distance of the facility, and said moving sound corresponding to the directional movement of the vehicle with respect to the facility, such that the moving sound provides the listener with an audio indication of the location of the vehicle with respect to the selected facility.

10. A method, according to claim 5 wherein the moving sound indicates to the listener that the selected facility is located either to left or right of the vehicle.

11. A method, according to claim 6 wherein the moving sound indicates to the listener that the selected facility is located either to the front or rear of the vehicle.

12. A method, according to claim 7 which further includes providing a visual indication of the location of the selected facility.

13. A vehicular navigation system, comprising:
at least one database for storing location information including facility location;
a device for estimating the current location of a vehicle;
a processor, coupled to the database and the device for estimating current locations, for determining the current location of a vehicle with respect to the location of a selected facility, and for determining when the vehicle is within a predetermined distance of the facility; and
an audio system for providing sounds to a listener, responsive to said determining means, said audio system including a stereophonic or three dimensional speaker system having a plurality of speakers surrounding the listener;
wherein said speakers output moving sound to the listener indicating that the vehicle is within the predetermined distance of the facility, and said moving sound corresponding to the directional movement of the vehicle with respect to the facility, such that the moving sound provides the listener with an audio indication of the location of the vehicle with respect to the selected facility.

14. A vehicular navigation system, according to claim 13 wherein the moving sound indicates to the listener that the selected facility is located either to left or right of the vehicle.

15. A vehicular navigation system, according to claim 14 wherein the moving sound indicates to the listener that the selected facility is located either to the front or rear of the vehicle.

16. A vehicular navigation system, according to claim 15 which further includes a display for providing a visual indication of the location of the selected facility.

* * * * *